March 30, 1937.  T. C. BROWNE  2,075,636
ART OF MOLDING AND MATRIX
Filed May 10, 1933

INVENTOR-
Theodore C. Browne
BY
ATTORNEY-

Patented Mar. 30, 1937

2,075,636

UNITED STATES PATENT OFFICE 2,075,636

ART OF MOLDING AND MATRIX

Theodore C. Browne, Hinsdale, Ill.

Application May 10, 1933, Serial No. 670,238

7 Claims. (Cl. 18—55)

This invention relates to the art of molding objects having a desired configuration or surface, either in relief or in intaglio, and has particular application to the art of producing so-called matrices or running plates for use in printing. However, it will be understood that while my invention has particular application thereto it is not limited to use in that field and is capable of application to many arts in which it may be desired to reproduce or duplicate an object having variations in elevation in its surface.

In the co-pending applications of Theodore C. Browne, and Theodore C. Browne and Alfred C. Buttfield, Serial Nos. 575,500 and 546,456, entitled "Method of manufacturing rubber printing plates and other articles of rubber" and "Method of forming rubber printing plates and other articles of rubber", respectively, there are disclosed processes for producing by photo-chemical processes a rubber film or sheet, the surface of which contains elevations and depressions corresponding to the exposure of the particular section to light.

For simplicity of explanation I may describe such plates produced according to the said processes as being generally similar to so-called halftone plates except that they are made of rubber, and may, if desired, have all of the usual characteristics of rubber such as elasticity, flexibility, deformability and self-restorability after deformation.

Under certain circumstances it may be desirable to use the plates so produced, which I term rubber half-tone plates, as a master for making duplicates, either negatives or positives as may be desired. For instance, having produced a rubber half-tone plate of a picture to be printed, it may be desired not to print directly from the rubber half-tone plate, but to produce from the rubber half-tone plate a hard and inflexible matrix from which running plates may be made or to produce directly from the rubber half-tone plate a running plate.

I have discovered that it is possible to duplicate exactly (in a reversed sense, as positive to negative) in hard material the relief configuration of the rubber half-tone plate by a process of molding, and while I have thus far referred to the use of rubber half-tone plates made by the processes to which reference has been made, it will be understood that the principles of my invention, as will be hereinafter explained, are applicable to the molding or duplicating of objects other than the rubber half-tone plates made by the above mentioned processes and that in the specification hereinafter the steps described and the principles explained are by way of example and not in limitation.

It is an object of my invention to provide for the production of duplicates of a surface characterized by variations in relief.

It is a further object of my invention to provide a method and apparatus for molding purposes permitting the use of masters of soft, yielding or resilient material such as soft rubber or the like.

It is a further object of my invention to provide a method and apparatus for molding in which the material or surface to be duplicated is relatively softer and more flexible than the final state of the material to be molded.

Still other objects and advantages of my invention will be apparent from the specification. The features of novelty, however, which I believe to be characteristic of my invention, are set forth with particularity in the appended claims. My invention, itself, however, both as to its fundamental principles and as to its particular embodiments will best be understood by reference to the specification and accompanying drawing, in which Fig. 1 is an elevation view of a press open, containing a mold and moldable material to be molded according to my process;

Figure 1:
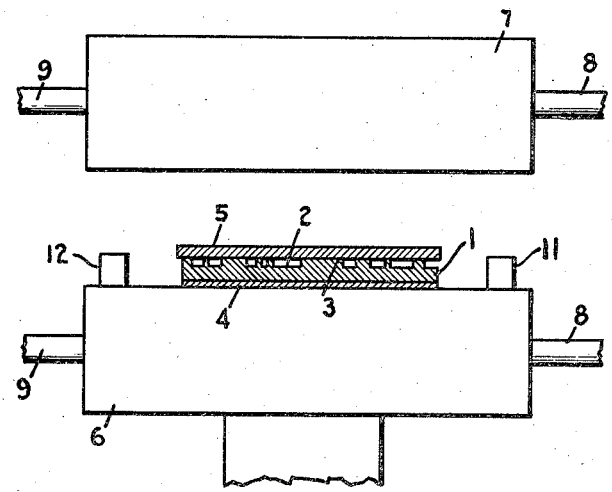
Figure 2:
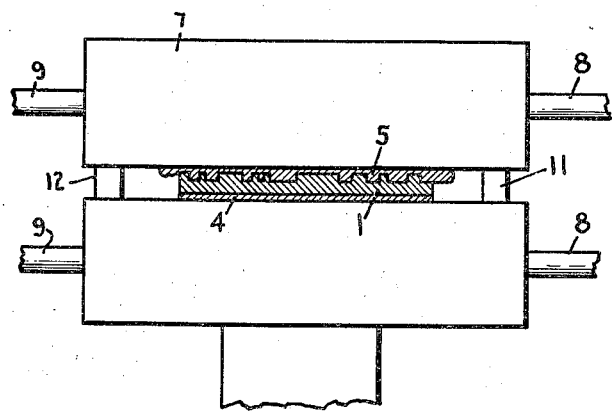
Fig. 2 is a similar view showing the press in closed position.

In the explanation of what I believe to be the principles of my invention, I find it convenient to employ certain definitions, among them the following:

(a) Thermo-setting as used herein is intended to designate a material (usually, although not necessarily, a resin) which has the quality of polymerizing and turning ultimately into a relatively hard, inflexible and inactive substance under the action of heat and pressure, and in the sense used herein the thermo-setting action is considered to be non-reversible. "Bakelite" is an example of a thermo-setting material under the foregoing definition.

(b) Thermo-plastic as used herein is intended to designate that quality of material which causes it to soften, flow and assume the shape of a confining vessel or surface under heat and pressure, and is reversible. Examples of thermo-plastic materials are sealing wax, asphalt, and the like.

(c) Thermo-active as used herein is intended as a generic term including both the thermo-setting and thermo-plastic species. It is also used to describe materials which are to a certain extent simultaneously thermo-setting and thermo-plastic.

(d) Cure or curing as used herein is intended to mean controlling the environment, such as temperature, pressure and time, of thermo-active material in such a manner as to cause it to become substantially hard and inflexible and may comprise the control of heat and pressure to produce a change in physical state or a change in chemical composition or both, but also includes producing a change in chemical composition, even though the final product is not hard and inflexible. Thus the vulcanization of soft rubber is a "cure".

Assuming now for the purposes of explanation that there is available a rubber film or sheet having the desired surface configuration which is desired to be duplicated and which has been produced by the processes referred to above, or by any other process. This may be indicated as a whole by 1, having a number of projections defining an upper plane 3 and a lower plane 2. It will be understood that it may be desired to produce in the molded substance a relief configuration which duplicates the changes in level between the planes 2 and 3, although it may not in all cases be desirable to have the molded material extend the entire distance from the plane 3 to the plane 2.

In some cases it will be satisfactory to have the molded material conform exactly to the configuration of the master in plane 3, but not necessarily in plane 2. In other cases it may be desirable to have the molded material correspond exactly to the master both in planes 2 and 3.

4 designates a layer of backing or reinforcing material which may, for instance, be thin and flexible metal, or thicker and inflexible metal, or other material, which may have been applied to the rubber plate 1 either before or after curing my cementing or vulcanizing.

5 represents a layer of moldable material which will hereinafter be described more fully.

6 and 7 indicate diagrammatically the lower and upper plates of a suitable press, which may be provided with passageways providing for the circulation of heating or cooling media diagrammatically as indicated at 8 and 9. Most commonly, steam at predetermined or selected pressure and temperature may be passed through the plates of the press, and the usual indicators and valves may be utilized for ascertaining and maintaining the desired condition.

It would be supposed in applying heat and pressure as shown in Fig. 1 where the moldable material 5 may be a layer of thermo-setting material such, for example, as phenol resin or the like, that the master 1 would simply be flattened and distorted by the pressure in much the same manner as soft rubber is deformed by pressing upon it and that a good clear impression could not be secured.

However, I have discovered that this does not occur when moldable material having the proper characteristics is chosen and treated in the manner hereafter explained. I have been able, for example, to use a soft rubber half-tone plate and mold hard and inflexible phenol resin plates against it having full dot depth and I have found that the dot will be clearly reproduced in its entirety.

In the following I shall give what I consider to be the explanation of why my process operates, but whether or not the explanation is correct, the facts are that it is possible to mold hard and inflexible duplicates against a master of soft rubber or like material, by proceeding as described herein.

In carrying out my invention I prefer to use as the moldable material thermo-setting resins such as phenol resin or similar material capable of being molded at relatively low temperatures and pressures. For example, very satisfactory results have been obtained with #AM 205 brown "Bakelite" and #AM 205 black "Bakelite", which may be molded at a pressure of approximately 350 pounds per square inch and a steam temperature corresponding to 50 to 100 pounds gauge steam pressure.

The moldable material is first preheated. The temperature of preheat, and the length of time thereof, may vary with size, shape, and composition of the moldable material, and the manner in which the heat is applied to it.

By way of example, with #205 brown and #205 black "Bakelite" above mentioned, approximately ¼" thick, a preheating of about one and one-half to two minutes at a temperature of approximately 305° F. is sufficient. The press is then closed by being brought against bearer blocks 11 and 12 which determine the thickness of the molded article, and the cure completed by the application of heat for the necessary time.

The preheating may be done in the press, if desired, or on a separate plate, and the preheated material then transferred to the mold. If it is done in the press, the press may be partly closed, until the upper plate contacts the moldable material, but does not apply any substantial pressure, and the preheating carried on. After the preheating, the press is closed against the bearers and the cure completed.

Figure 3:
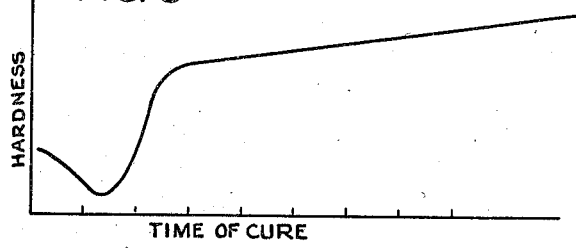
Fig. 3 is a chart to which reference may be had for what I believe to be the explanation of my invention.

The materials which I have found to be satisfactory I believe to have a curing characteristic of the general nature shown by Fig. 3, in which there seems to be a state in the initial stage of the cure during which the moldable material becomes very soft and may even become almost or completely liquid. It flows into the interstices of the original and fills them thoroughly. Then under the influence of continued heat and pressure, it begins to set and finally becomes completely or substantially completely cured. After it has been cured to the desired extent the press is opened and the original may then be stripped from the molded product.

Since one member of the pair is soft and flexible the master may be readily stripped from the duplicate without injury to either.

In selecting the moldable material a wide latitude of choice appears to be possible. Thermo-setting resins of the general nature of phenol resins may be utilized, provided that they become substantially liquid, or softer than the master, at a temperature lower than that which will harm the master. Glyptal resins, for instance, might be utilized, or material of the nature of sealing wax, provided that their characteristics are such that they become softer than the soft rubber original at temperatures which do not seriously affect the original.

While I have shown and described certain preferred embodiments of my invention, it will be understood that modifications and changes may be made without departing from the spirit and scope thereof, as will be apparent to those skilled in the art.

I claim:

1. A printing plate matrix for forming running printing plates of thermo-active material, having a resilient printing character-forming molding face.

2. A printing plate matrix for forming running printing plates of thermo-active material, having a printing character-forming molding face of material capable of relatively large deformation within its elastic limits.

3. A printing plate matrix for forming running printing plates of thermo-active material, having a printing character-forming molding face of relatively soft rubber.

4. The method of producing a running printing plate of thermo-active material, which comprises the step of applying heat and pressure to said material, while in contact with a printing character-forming mold face of relatively soft, elastic material.

5. The method of producing a running printing plate which comprises the step of applying pressure to a plastic material while in contact with a printing character-forming molding face of elastic and yielding material.

6. The process of molding a duplicate running printing plate from a master of soft and resilient material which comprises applying to the printing character-forming face of said master a body of thermo-active material capable of becoming extremely plastic at temperatures insufficient to harm said master and capable of becoming substantially hard and inflexible by control of curing factors, and applying heat and pressure to cause said moldable material to flow into and take the contour of the master, and controlling the curing factors to cause said material to set.

7. The process of molding a running printing plate from a master of soft resilient material which comprises applying to the printing character-forming face of said master a body of thermo-active material, applying a degree of heat to said body to cause said body to become plastic at a temperature insufficient to harm said master, applying heat and pressure to cause said body to flow into and take the contour of the master, and controlling the curing factors to cause said body to set.

THEODORE C. BROWNE.